United States Patent [19]

Swett et al.

[11] 4,392,594
[45] Jul. 12, 1983

[54] WATERING CAN

[75] Inventors: James B. Swett, Altamonte Springs, Fla.; Ann A. Arnold, Atlanta, Ga.

[73] Assignee: Dart Industries Inc., Northbrook, Ill.

[21] Appl. No.: 181,605

[22] Filed: Aug. 27, 1980

[51] Int. Cl.³ .............................................. B67D 3/00
[52] U.S. Cl. .................................... 222/530; 222/475
[58] Field of Search ............... 222/526, 527, 528, 529, 222/530, 478, 538, 465, 475; D23/11, 5; D9/436, 443, 447; 239/375, 376, 377, 378, 328, 436

[56] References Cited

U.S. PATENT DOCUMENTS

| D. 184,893 | 4/1959 | Reinicke | D58/17 |
| D. 229,056 | 11/1973 | Grotz | D23/01 |
| D. 240,129 | 6/1976 | Grotz | D23/01 |
| 583,482 | 9/1897 | Kagey | 239/375 |
| 630,583 | 8/1889 | Birk . | |
| 796,717 | 3/1905 | Gray . | |
| 1,315,724 | 9/1919 | Hipwell | 222/530 |
| 1,869,869 | 8/1932 | Smith | 222/475 X |
| 1,875,992 | 9/1932 | Clifford | 222/475 X |
| 1,890,608 | 11/1932 | Hurtado | 239/328 |
| 2,131,714 | 9/1938 | Woelfer, Jr. . | |
| 2,516,728 | 7/1950 | Smith | 222/530 |
| 2,737,417 | 3/1956 | Gundersen | 299/102 |
| 3,648,933 | 3/1972 | Grotz | 239/222 |

FOREIGN PATENT DOCUMENTS

| 30729 | 4/1907 | Austria | 239/377 |
| 15508 | of 1906 | United Kingdom | 222/529 |

Primary Examiner—Stanley H. Tollberg
Attorney, Agent, or Firm—Leigh B. Taylor

[57] ABSTRACT

A watering can having a multiplicity of fluid dispensing means including a spout and a remote flexible conduit which, when not in use, is fixedly stored in appropriately recessed areas of the handle and cover of the can.

4 Claims, 8 Drawing Figures

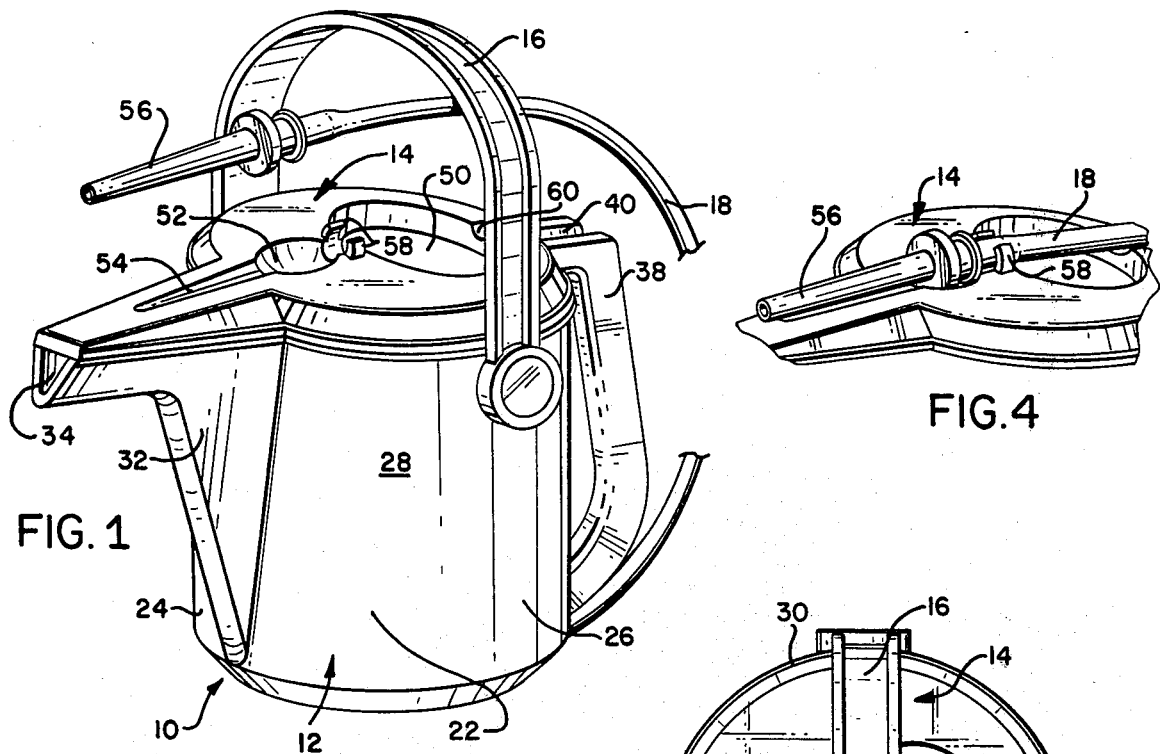

WATERING CAN

This invention relates to receptacles and more particularly to those which will be useful in the care of various houseplants. This particular receptacle is principally intended for use as a watering can and has been specifically designed and constructed so that the horticulturist needs with respect to the application of fluid media to various plants can be easily and effectively met.

It should be understood that the differing varieties of plants and flowers demand that they be watered and cared for in different fashions. Accordingly, it is to the horticulturist's advantage to have a multiple of differing ways within which to apply needed fluid media to these house plants. In the past it has been typical for watering cans to be of a relative uniform character wherein each exhibited a receptacle capable of storing the fluid media to be dispensed such further having a handle means by which to grasp such receptacle easily and a pour spout or sprinkling head through which the media might be applied to the shrub plant or flower. Thus, only a single means of application of water or the like to the plant was made available to the user.

It is an object of the present invention that the user be afforded a multiplicity of means for application of fluid media to his house plants. To afford the user such options, this device, in addition to the normal receptacle includes a plurality of dispensing elements whose character differ to such an extent that application of the fluid media to the plant can be more readily and easily controlled. Another object of the instant device is to afford a receptacle that the user can easily manipulate into a final position for use and which in its application or dispensing of fluid media will uniformly and effectively expel the same. Another object is to securely retain all elements of the device in a unitary fashion so that during use none will interfere with the other.

Additional advantages and objectives will become more apparent upon continued reference to the appended specification and claims drawings, wherein, FIG. 1 is a top perspective view of the watering can of this invention showing the various elements thereof in their respective association one with another;

FIG. 2 is a top plan view of the watering can wherein the flexible fluid conduit is disassociated therefrom;

FIG. 3 is a side elevational view of the receptacle and various other elements forming the watering can again illustrating the flexible fluid conduit and valve therefor removed from the receptacle and its closure in anticipation of use;

FIG. 4 shows a partial top perspective view of the watering can closure illustrating the flexible fluid conduit and its associated valve in fixed relationship with such cover;

Figure 5:
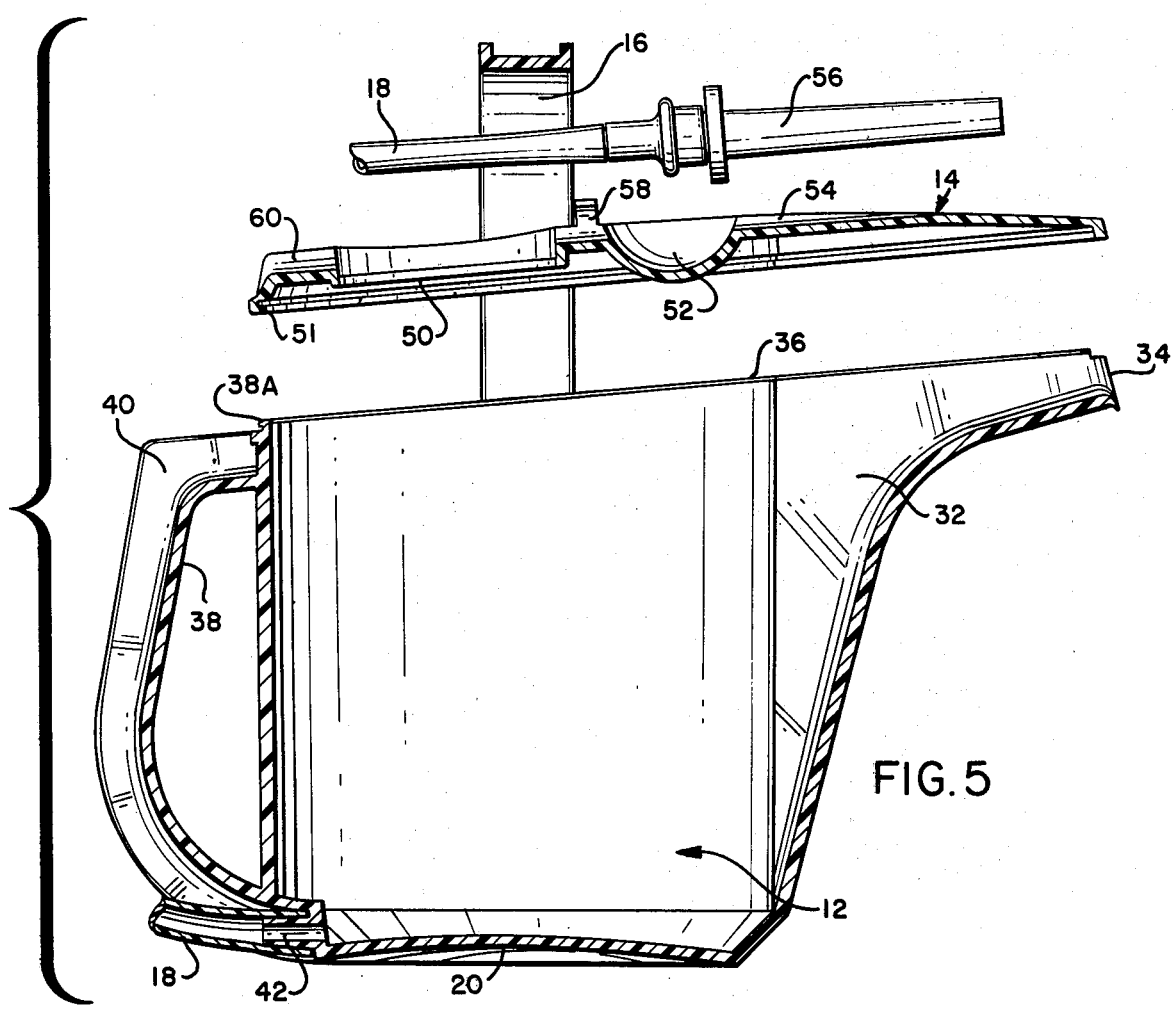
FIG. 5 is an enlarged exploded cross-sectional view of the watering can showing the flexible fluid conduit and cover.

Referring now to the drawings and more particularly to FIG. 1 it will become apparent that the watering can 10 includes a plurality of elements in its make-up, these being a receptacle 12, a cover member 14, a ball 16 and a flexible fluid conduit 18. The receptacle 12 is of course the principal container element for the fluid media that the horticulturist will dispense from the instant device. Such receptacle includes an integral bottom wall 20 and side wall arrangement 22. The side wall arrangement 22 can further be designated as having several separate segments, one of which, 24 forms the very front of the receptacle body. A second and opposite segment 26 forms the rear portion of the side wall arrangement and additional opposed segments 28, 30 complete the wall structure. As part of the front side wall segment 24 there is located an integral channel-like portion 32 which extends from a point juxtaposed with said bottom wall 20 to the very top edge opening of the receptacle 12 and angularly protrudes outwardly therefrom as a V-shaped element which forms the principal pouring spout or opening 34.

As indicated, the receptacle 12 and the channel-like portion 32 both exhibit an upwardly directed opening or upper extremity 36 bounded by a projecting lip 38A (FIGS. 5 through 8).

The second segment 26 of side wall arrangement 22 includes a protruding handle member 38 which may be seen from FIGS. 1, 2, 3, and 5 to be slotted as at 40 along that edge which is most remote from the side wall arrangement 22. The purpose of the slot 40 will be discussed hereinafter in more detail.

In the preferred embodiment of this invention one also finds a second opening 42 to the interior of the receptacle 12. Such opening 42 is ideally located adjacent the receptacle bottom wall 20 at a position directly below the lowermost extremity of handle member 38 (FIG. 5). The receptacle, therefore, ideally includes the two mentioned openings 34 and 42 through which fluid media retained within receptacle 12 may be dispensed at the will of the user horticulturist depending upon his particular need. The opening 42 is, of course, effectively closured by the flexible fluid conduit member 18 which can be seen to be attached thereto.

Figure 6:
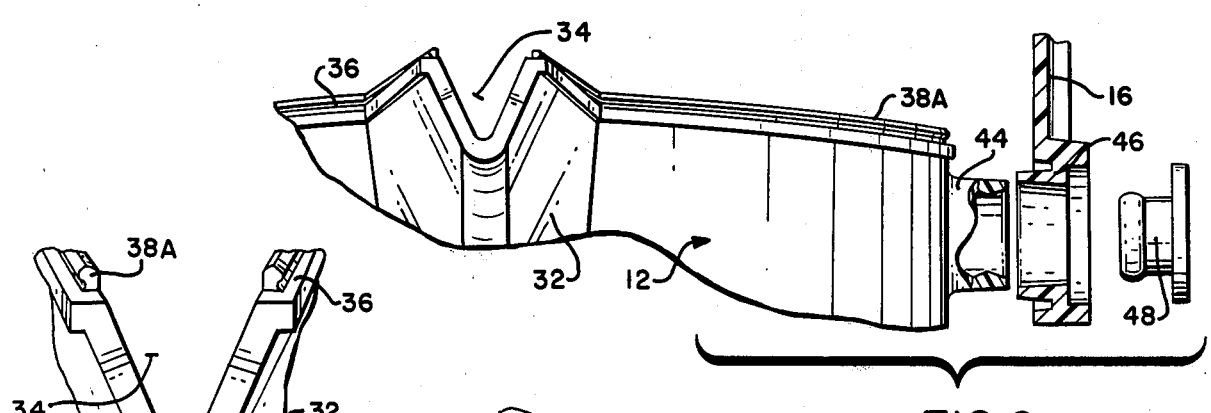
FIG. 6 is a partial front and cross-sectional view of the watering can illustrating the assembly of the bail to the receptacle portion thereof.
Figure 7:
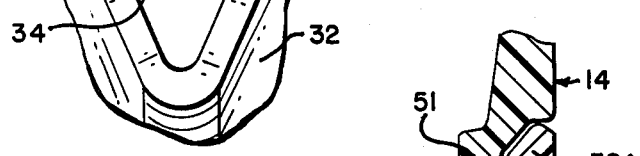
FIG. 7 is a partial front elevational view illustrating the uppermost extremity of the pouring spout construction of the watering can.
Figure 8:
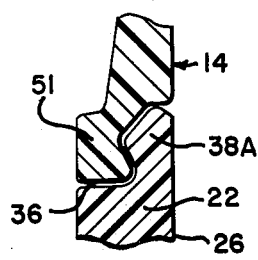
FIG. 8 is an enlarged cross-sectional view taken at line 8 in FIG. 3 and illustrating the interconnection means between the cover and receptacle portions of the watering can.

The receptacle 12 also ideally is intended to include the mentioned bail 16 which bail as can best be seen in FIG. 6 is attached to the additional segments 28, 30 of the side wall arrangement 22. These side wall segments 28, 30 can be seen to have positioned thereon short, hollow, stub-like axles 44 over which may be positioned the hub portions 46 at each end of bail 16. The assembly is thereafter fixedly but rotatably attached in place by the plug-like fasteners 48 which pass through the bail hubs 46 and into a snap-fit relationship with the interior axes 44.

The cover member 14 is anticipated as having an opening through the top surface thereof, so that fluid media may be easily inserted into receptacle 12 and also incorporates around its outer peripheral edge a detent like flange 51 (FIG. 8) which is adapted to interlock with the projecting lip 38A that protrudes from the upper extremity of side wall arrangement 22. The mentioned interengagement produces an abutting relationship between the upper extremity 36 of side wall 22 and cover member 14 thereby holding it in firm yet removable relationship with receptacle 12. The mentioned cover member 14 also includes along its uppermost surface the recesses 52, 54 which are appropriately shaped to accommodate receipt of the valve and nozzle member 56 that is attached to the remote end of flexible fluid conduit 18. Such cover member 14 also upon its upper surface exposes a holding means 58 which is comprised of two clip-type members protruding from that upper surface. When it is desired to either store the watering can or use same by means of pouring fluid media through the opening 34, the flexible conduit 18 and its attached valve and nozzle 56 may be securely retained in an out of the way position as can best be seen in FIG. 4. In such position the flexible hose can be seen to be retained by the holding means 58 between its clips. Furthermore, because of the appropriate recesses 52, 54, 60 in the cover member 14, the valve and nozzle 56 and flexible conduit 18 are nestled therein. Similarly, in such position the flexible conduit 18 is closely drawn into the slot 40 in handle member 38. Accordingly, the user's hand in gripping handle member 38 also surrounds the flexible conduit 18 and further assures that it will be retained in its out of the way position during this usage.

In the event that the horticulturist user desires to be more selective in his watering technique, he may use the flexible conduit 18 by removing the same and valve and nozzle 56 from its retained position, elevating the receptacle 12 activating the valve 56 and allowing fluid media to be dispensed from the lower valve 56 and fluid conduit 18 to the appropriate position within his planted area. In this fashion, discreet quantities of fluid media may be dispensed discreetly at various positions without interfering with a particular plant portion or associated plants.

It is contemplated that the watering can of this invention may be manufactured from a variety of materials but the preferred embodiment thereof will be ideally produced from suitable plastics, among which is polypropylene or ABS. From the foregoing it should be appreciated that the watering can as described includes a variety of features not previously known which features enhance the ability of the user to more effectively apply fluid media to selective plants as may be desired. Accordingly, and without limitation, it should be appreciated that in the specification abstract, a plastic watering can having dual dispensing capabilities wherein copious quantities of fluid media may be dispensed through one can opening and wherein discreet quantities of fluid media may be appropriately and controllably dispensed through a separate opening provided within the can receptacle. For the dispensing of discreet quantities of fluid media the invention further contemplates use of a flexible conduit and valving mechanism which may be readily retained in juxtaposition with the watering can when not in use and be easily removed therefrom for use.

We claim:

1. A receptacle for retaining and selectively dispensing liquid, said receptacle including a bottom and surrounding side wall terminating in an upper edge defining a fluid receiving interior with an open top, said side wall including one vertical segment having a projecting and laterally outwardly directed and upwardly opening discharge spout adjacent the upper open top of the fluid receiving interior, said side wall having a second vertical segment remote from said one segment and having a handle member projecting therefrom, said second segment incorporating a discharge opening from the receptacle interior below and in alignment with said handle member, said handle member extending vertically from said discharge opening to approximately the upper edge of the side wall, a flexible conduit in communication with and extending from said discharge opening, said handle member having a slot defined therein and extending along the vertical height of the handle member for removable engagement of the conduit in a recessed position therein from the discharge opening to the upper edge of the side wall, a cover member overlying and removably engagable with the upper edge of the side wall, said cover member including recess means therein for accommodating said flexible conduit, said cover member further including holding means positioned thereon for selectively receiving a portion of said conduit and holding said conduit within said cover member recess means and said handle member slot.

2. A receptacle according to claim 1 wherein said second segment is approximately opposite said one segment, and the slot in said handle member extends along a peripheral edge thereof most remote from said second segment, said slot being of a depth to completely receive the cross-section of the conduit therein, said cover member recess means forming a general continuation of the handle member slot.

3. A receptacle for retaining and selectively dispensing liquid, said receptacle including a bottom and surrounding side wall terminating in an upper edge defining a fluid receiving interior with an open top, said side wall including one vertical segment having a projecting generally vertical liquid accommodating channel portion thereon which communicates with the interior along the height thereof and which terminates in a laterally outwardly directed and upwardly opening discharge spout adjacent the upper open top of the fluid receiving interior, said side wall having a second vertical segment remote from said one segment and having a handle member projecting therefrom, said second segment incorporating a discharge opening from the receptacle interior below and in alignment with said handle member, said handle member extends vertically from said discharge opening to approximately the upper edge of the side wall, a flexible conduit in communication with and extending from said discharge opening, said handle member having a slot defined therein and extending along the vertical height of the handle member for removable engagement of the conduit in a recessed position therein from the discharge opening to the upper edge of the side wall, a cover member overlying and removable engagable with the upper edge of the side wall, said cover member including holding means positioned thereon for selectively receiving a portion of said conduit and holding said conduit in overlying relation to said cover member, said cover member including a portion conforming to and overlying the discharge spout, confining the opening therein to the remote end thereof.

4. A receptacle according to claim 3 wherein additional side wall segments mount a rotatably positionable bail thereon.

* * * * *